US010195593B2

(12) United States Patent
Wang et al.

(10) Patent No.: US 10,195,593 B2
(45) Date of Patent: Feb. 5, 2019

(54) METHOD FOR PREPARING A SODIUM FAUJASITE CATALYST AND ITS USE IN PRODUCING ACRYLIC ACID (71) Applicant: Agency for Science, Technology and Research, Singapore (SG)

(72) Inventors: Chuan Wang, Singapore (SG); Zhen Guo, Singapore (SG); Armando Borgna, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 169 days.

(21) Appl. No.: 15/129,942

(22) PCT Filed: Mar. 26, 2015

(86) PCT No.: PCT/SG2015/000097
§ 371 (c)(1),
(2) Date: Sep. 28, 2016

(87) PCT Pub. No.: WO2015/147752
PCT Pub. Date: Oct. 1, 2015

(65) Prior Publication Data
US 2017/0157597 A1 Jun. 8, 2017

(30) Foreign Application Priority Data
Mar. 28, 2014 (SG) .......................... 10201401083Q (51) Int. Cl.
*B01J 29/06* (2006.01)
*B01J 29/08* (2006.01)
*B01J 29/04* (2006.01)
*B01J 35/10* (2006.01)
*B01J 37/30* (2006.01)
*C01B 39/20* (2006.01)
*C01B 39/02* (2006.01)
*B01J 37/02* (2006.01)
*B01J 37/08* (2006.01)

(52) U.S. Cl.
CPC ............ *B01J 29/08* (2013.01); *B01J 29/041* (2013.01); *B01J 35/109* (2013.01); *B01J 35/1095* (2013.01); *B01J 37/0201* (2013.01); *B01J 37/08* (2013.01); *B01J 37/30* (2013.01); *C01B 39/026* (2013.01); *C01B 39/20* (2013.01); *B01J 2029/081* (2013.01); *B01J 2229/16* (2013.01); *B01J 2229/186* (2013.01); *B01J 2229/38* (2013.01)

(58) Field of Classification Search
CPC .... B01J 29/08; B01J 29/041; B01J 2029/081; B01J 2229/16; B01J 2229/186; B01J 2229/38; B01J 35/1095; B01J 35/109; B01J 37/0201; B01J 37/08; B01J 37/30; C01B 39/026; C01B 39/20

USPC ...................................................... 502/79, 85
See application file for complete search history.

(56) References Cited

U.S. PATENT DOCUMENTS

| 2,859,240 | A | 11/1958 | Holmen et al. |
|---|---|---|---|
| 4,729,978 | A | 3/1988 | Sawicki |
| 4,786,756 | A | 11/1988 | Paparizos et al. |
| 5,220,078 | A | 6/1993 | Knifton et al. |
| 2003/0050181 | A1 | 3/2003 | Gibson et al. |
| 2010/0113822 | A1 | 5/2010 | Craciun et al. |
| 2011/0118107 | A1 | 5/2011 | Garcia-Martinez et al. |
| 2012/0277467 | A1 | 11/2012 | Onda et al. |
| 2013/0183230 | A1 | 7/2013 | Li et al. |

FOREIGN PATENT DOCUMENTS

| GB | 1058188 A | 2/1967 |
|---|---|---|
| WO | 2007106100 A1 | 9/2007 |

OTHER PUBLICATIONS

Zhang et al., "Selective conversion of lactic acid to acrylic acid over alkali and alkaline-earth metal co-modified NaY zeolites", Catalysis Science & Technology, Nov. 11, 2017.*
Extended European Search Report for European Patent Application No. 15768073.7 dated Aug. 2, 2017, pp. 1-8.
Written Opinion for International Application No. PCT/SG2015/000097 dated May 25, 2015, pp. 1-4.
Wadley et al, "Lactic Acid Conversion to 2,3-Pentanedione and Acrylic Acid over Silica-Supported Sodium Nitrate: Reaction Optimization and Identification of Sodium Lactate as the Active Catalyst," Journal of Catalysis, vol. 165, 1977, pp. 162-171.
Shi et al., "KNaY-Zeolite Catalyzed Dehydration of Methyl Lactate," Chinese Chemical Letters, vol. 18, 2007, pp. 476-478.
Zhang et al., "Catalytic Dehydration of Lactic Acid to Acrylic Acid Over Sulfate Catalysts," Canadian Journal of Chemical Engineering, vol. 86, Dec. 2008, pp. 1047-1053.
Sun et al, "NaY Zeolites Catalyze Dehydration of Lactic Acid to Acrylic Acid: Studies on the Effects of Anions in Potassium Salts," Ind. Eng. Chem. Res., vol. 49, 2010, pp. 9082-9087.
Yan et al, "NaY Zeolites Modified by La3+ and Ba2+: The Effect of Synthesis Details on Surface Structure and Catalytic Performance for Lactic Acid to Acrylic Acid," Journal of Rare Earths, vol. 28, No. 5, Oct. 2010, pp. 803-806.
Zhang, et al, "Efficient Acrylic Acid Production Through Bio Lactic Acid Dehydration Over NaY Zeolite Modified by Alkali Phosphates," ACS Catalysis, vol. 1, 2011, pp. 32-41.
Yan et al., "Alkaline Earth metal Modified NaY for Lactic Acid Dehydration to Acrylic Acid: Effect of Basic Sites on the Catalytic Performance," Chinese Journal of Catalysis, vol. 32, Issue 3, 2011, pp. 405-411.

(Continued)

*Primary Examiner* — Elizabeth D Wood
(74) *Attorney, Agent, or Firm* — Winstead, P.C.

(57) ABSTRACT

The invention relates generally to a sodium faujasite catalyst, and in particular the use of the sodium faujasite catalyst in producing acrylic acid. In particular, the invention relates to the use of the sodium faujasite catalyst in catalytic dehydration of lactic acid and 3-hydroxypropionic acid (3-HP) to produce acrylic acid.

20 Claims, 6 Drawing Sheets

(56) References Cited

OTHER PUBLICATIONS

Ghantani et al., "Catalytic Dehydration of Lactic Acid to Acrylic Acid Using Calcium Hydroxyapatite Catalysts," Green Chemistry, vol. 15, 2013, pp. 1211-1217.
Bassi et al., "Measurement of Effective Diffusivities of Lactose and Lactic Acid in 3% Agarose Gel Membrane," Biotechnology and Bioengineering, vol. 30, 1987, pp. 794-797.
Lok et al., "Silicoaluminophosphate Molecular Sieves: Another New Class of Microporous Crystalline Inorganic Solids," J. Am. Chem. Soc., vol. 106, 1984, pp. 6092-6093.
International Preliminary Report on Patentability for International Application No. PCT/SG2015/000097 dated Oct. 4, 2016, pp. 1-6.

* cited by examiner

METHOD FOR PREPARING A SODIUM FAUJASITE CATALYST AND ITS USE IN PRODUCING ACRYLIC ACID

CROSS-REFERENCE TO RELATED APPLICATION

This application claims the benefit of priority of Singapore Patent Application No. 10201401083Q, filed Mar. 28, 2014, the contents of which being hereby incorporated by reference in its entirety for all purposes.

TECHNICAL FIELD

The invention relates generally to a sodium faujasite catalyst, and in particular the use of the sodium faujasite catalyst in producing acrylic acid. In particular, the invention relates to the use of the sodium faujasite catalyst in catalytic dehydration of lactic acid and 3-hydroxypropionic acid (3-HP) to produce acrylic acid.

BACKGROUND

As a commodity chemical, acrylic acid (AA) is widely used in the manufacture of paint additives, adhesives, textiles and super-absorbent materials. The market size of acrylic acid and acrylate esters is over $10 billion in sales and it is estimated that annual growth of this market will be 4-5% globally. Currently acrylic acid is produced mainly in petrochemical industry by two-step oxidation of propylene. The challenge of the traditional process is the full dependence on the non-renewable fossil source.

Recently, biomass has attracted intense attention as an alternative energy source and chemical feedstock due to the depletion of fossil fuels and rising concern over environmental protection. Tremendous efforts have been, devoted to the production of acrylic acid from the dehydration of lactic acid (LA) or 3-hydroxypropionic acid (3-HP) which can be obtained from the transformation of biomass. Manufacturing LA from the fermentation of biomass has been widely applied in industry.

However, catalytic dehydration of LA to AA remains a big challenge. As shown in Table 1 and 2, the main challenge of this catalytic process is the low yield of AA, due to the formation of by-products, such as acetaldehyde, pentanedione, and propanoic acid. As of today, the highest yield of AA reported is 72% using calcium phosphate as the catalyst. Another important issue is the deactivation of catalyst. For the calcium phosphate process, the yield of AA drops to 50% after 60 h run, which is about 30% loss in the yield. All reported catalysts suffer the similar deactivation or even more. For example, potassium iodine modified sodium Y zeolite (KI/NaY) gives 66.3% yield of AA (as shown in Table 2), but the yield decreases to 43% within 6 h.

TABLE 1

Summary of patents for the catalytic dehydration of LA to AA

| Catalysts | Yield of AA (%) | WHSV$^a$ (g/($g_{cat}$ · h)) | Temperature (K) | Patent information |
|---|---|---|---|---|
| Na$_2$SO$_4$ + CaSO$_4$ | 68.0 | — | 673 | 2859240/USA/1958 |
| NaH$_2$PO$_4$/Silica | 58.0 | — | 623 | 4729978/USA/1988 |
| AlPO$_4$ | 43.0 | 0.054 | 613 | 4786756/USA/1988 |
| Ca$_x$(PO$_4$)$_y$ | 72.0 | 0.456 | 623 | 0277467/USA/2012 |

$^a$WHSV: weight hourly space velocity = (mass flow rate of reactant)/(weight of catalyst).

TABLE 2

Summary of academic papers for the catalytic dehydration of LA to AA

| Catalysts | Yield of AA (%) | WHSV$^a$ (g/($g_{cat}$·h)) | Temperature (K) | References |
|---|---|---|---|---|
| NaNO$_3$/SiO$_2$ | 26.4 | 5.1 | 640 | J. Catal., 1997, 165, 162. |
| La/NaY | 56.3 | — | 623 | Chin. Chem. Lett., 2007, 18. 476. |
| CaSO$_4$ | 63.7 | 0.078 | 603 | Can. J. Chem. Eng., 2008, 86, 1047. |
| KI/NaY | 66.3 | 0.87 | 598 | Ind. Eng. Chem. Res. 2010, 49, 9082. |
| La—Ba/NaY | 41.6 | — | 598 | J. Rare Earth., 2010, 28, 803. |
| Na$_2$HPO$_4$/NaY | 58.4 | — | 613 | ACS Catal., 2011, 1, 32. |
| Ba/NaY | 44.6 | — | 598 | Chin. J. Catal., 2011, 32: 405. |
| hydroxyapatite | 60.0 | 3 | 648 | Green Chem., 2013, 15, 1211. |

$^a$WHSV: weight hourly space velocity = (mass flow rate of reactant)/(weight of catalyst).

Thus, there remains a need to provide for an alternative catalyst that overcomes or at least alleviates the above drawbacks.

SUMMARY

The inventors have surprisingly found that by modifying commercial sodium faujasite zeolite, a very high yield of acrylic acid (83%) can be obtained from the catalytic dehydration of lactic acid. Not only the yield outperforms all the reported catalysts, the stability of present sodium faujasite catalyst is also competitive, with yield of AA maintaining above 50% after 60 h processing. Moreover, the cost of present sodium faujasite catalyst is cheap (less than 10 USD/kg). The same sodium faujasite catalyst also shows superior catalytic capability for dehydration of 3-hydroxypropionic acid, compared to results reported by others.

Thus, in a first aspect of the invention, a method for preparing a sodium faujasite catalyst is disclosed. The method includes:

etching a sodium faujasite zeolite of formula (NaAlO$_2$)(SiO$_2$)$_x$·yH$_2$O, 1.2<x<450, 0<y<16 to create mesopores and macropores in the microporous framework and obtain an etched sodium faujasite zeolite;

loading calcium onto the etched sodium faujasite zeolite to obtain a calcium-loaded sodium faujasite zeolite; and loading alkali metal hydroxide onto the, calcium-loaded sodium faujasite zeolite to obtain the sodium faujasite catalyst.

According to a second aspect of the invention, the sodium faujasite catalyst of the first aspect is used in the catalytic dehydration of lactic acid or 3-hydroxypropionic acid.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which thea invention may be practised. These embodiments are described in sufficient detail to enable those skilled in the art to practise the invention. Other embodiments may be utilized and changes may be made without departing from the scope of the invention. The various embodiments are not necessarily mutually exclusive, as some embodiments can be combined with one or more other embodiments to form new embodiments.

In a first aspect of the invention, a method for preparing a sodium faujasite catalyst is disclosed. The method includes etching a sodium faujasite zeolite of formula (NaAlO$_2$)(SiO$_2$)$_x$·yH$_2$O, 1.2<x<450, 0<y<16 to create mesopores and macropores in the microporous framework and obtain an etched sodium faujasite zeolite.

It is known that a sodium faujasite zeolite contains a microporous framework. According to the definition of the International Union of Pure and Applied Chemistry (IUPAC), the term "mesopore/mesoporous" refers to a pore size in the range of 2 nm to 50 nm; while a pore size below 2 nm is termed a micropore range, and a pore size that is greater than 50 nm is termed a macropore range.

As mentioned above, the mesopores and macropores are created in the microporous framework of the sodium faujasite zeolite by etching. In other words, mesopores and macropores are created by etching building blocks (silica and/or alumina) out of the initial micropores and this step affords the advantage that transport resistance of reactant molecules during a chemical reaction is reduced, thereby increasing yield. In one disclosed embodiment to be described in more detail in later paragraphs, etching of the sodium faujasite zeolite to create larger pores therein results in significant increase in the yield of acrylic acid (AA) from 40% to 60% during dehydration of lactic acid when the etched sodium faujasite zeolite is used as the catalyst. At the same time, selectivity of AA is increased and side reactions are subdued.

In various embodiments, the etching step may include etching under heat. For example, the sodium faujasite zeolite may be etched at between 298 K and 423 K, such as at about 298 K, about 303 K, about 308 K, about 313 K, about 318 K, about 323 K, about 328 K, about 333 K, about 338 K, about 343 K, about 348 K, about 353 K, about 358 K, about 363 K, about 368 K, about 373 K, about 378 K, about 383 K, about 388 K, about 393 K, about 398 K, about 403 K, about 408 K, about 413 K, about 418 K, and about 423 K.

In preferred embodiments, the etching step may include etching at about 343 K.

In various embodiments, the etching step may further include etching under stirring. For example, the stirring may be carried out by a magnetic stirrer, mechanical stirrer, shaker, or any other common stirring method.

In various embodiments, the etching step may further include etching under reflux.

In various embodiments, the etching step may include etching by an etchant selected from the group consisting of a base and an organic etchant.

For example, in case of an etchant being a base, the base may be selected from the group consisting of lithium hydroxide (LiOH), sodium hydroxide (NaOH), potassium hydroxide (KOH), rubidium hydroxide (RbOH), caesium hydroxide (CsOH), and mixtures thereof.

In preferred embodiments, the base may be sodium hydroxide.

In case of an etching being an organic etchant, the organic etchant may ethylenediaminetetraacetic acid (EDTA).

In various embodiments, the method may include calcining the sodium faujasite zeolite prior to the etching.

The method for preparing the sodium faujasite catalyst further includes loading calcium onto the etched sodium faujasite zeolite to obtain a calcium-loaded sodium faujasite zeolite.

As mentioned earlier, deactivation of conventional catalysts such as calcium phosphate is an issue in the dehydration of lactic acid to acrylic acid. To address this issue, the inventors have surprising found that by introducing a metal cation such as calcium as promotor to the etched sodium faujasite zeolite, stability of the modified sodium faujasite catalyst can be enhanced.

In various embodiments, calcium may be loaded onto the etched sodium faujasite zeolite by loading a calcium salt onto the etched sodium faujasite zeolite by an impregnation method, such as an incipient wetness impregnation method.

In preferred embodiments, the calcium salt introduced by the impregnation method or the incipient wetness impregnation method may be calcium nitrate (Ca(NO$_3$)$_2$).

In various embodiments, the method may further include centrifuging the etched sodium faujasite zeolite prior to the loading of calcium. Preferably, after centrifuging the etched sodium faujasite zeolite is washed.

The method for preparing the sodium faujasite catalyst further includes loading alkali metal hydroxide onto the calcium-loaded sodium faujasite zeolite to obtain the sodium faujasite catalyst.

The step of loading alkali metal hydroxide to the calcium-loaded sodium faujasite zeolite modifies the acid-base property of zeolite, thereby leading to the selectivity to acrylic acid being significantly improved, probably due to the balanced acid and base sites on the catalyst.

In various embodiments, the alkali metal hydroxide may be selected from the group consisting of lithium hydroxide (LiOH), sodium hydroxide (NaOH), potassium hydroxide (KOH), rubidium hydroxide (RbOH), caesium hydroxide (CsOH), and mixtures thereof.

In preferred embodiments, the alkali metal hydroxide may be potassium hydroxide.

In various embodiments, the method may further include calcining the calcium-loaded sodium faujasite zeolite prior to the loading of alkali metal hydroxide.

After obtaining the sodium faujasite catalyst thus formed by the method, the sodium faujasite catalyst may be further processed by drying, followed by pelletizing the dry sodium faujasite catalyst.

In order that the invention may be readily understood and put into practical effect, particular embodiments will now be described by way of the following non-limiting examples.

In this example, the use of sodium faujasite catalyst obtained by the method herein described is illustrated in the dehydration of lactic acid or 3-hydroxypropionic acid to produce acrylic acid.

The catalyst (denoted as KOH—Ca—NaY*) is prepared by a three-step modification of sodium Y zeolite (NaY), which is a faujasite zeolite. In the first step, the structure of NaY is engineered by etching the silica building blocks to create mesopores in the microporous framework of NaY. The etched NaY is denoted as NaY*.

The second step is to add calcium on the etched NaY (denoted as Ca—NaY*), in order to enhance the, stability of the catalyst.

The last step is to modify the acid-base property of Ca—NaY* by loading potassium hydroxide (denoted as KOH—Ca—NaY*). The selectivity to AA is significantly improved by addition of KOH, probably due to the balanced acid and base sites on the catalyst.

The detailed synthesis procedure of KOH—Ca—NaY* is as follows: Commercial NaY is calcined at 732 K for 5 h to remove adsorbed water and residue templates. Then, NaY is etched by aqueous solution of NaOH under heat at 343 K with stirring. Next, the solid is collected by centrifugation and washed thoroughly with deionized water to remove residual NaOH and silicates. Subsequently, 1 mmol of $Ca(NO_3)_2$ is added onto 1 g of NaY* by wetness impregnation method and then the dried solid was calcined to remove nitrate anions. Finally, 1 mmol of KOH is loaded onto 1 g of Ca—NaY* followed by dryness at 333 K. The powder samples are pelletized to particles with mesh size of 400-600 micrometre before the catalytic evaluation.

Dehydration of lactic acid (LA) is performed in a fixed-bed reactor at atmosphere pressure under continuous mode. 0.2-1.0 g of catalysts are loaded in the centre of the reactor. Reaction temperatures range from 523-643 K. The feedstock contains 20 wt. % of LA in water and the flow rate of the liquid feedstock is maintained at 0.02 ml/min. Inert gas (e.g. helium or nitrogen) is used as a carrier gas, the flow rate of carrier gas is 30 ml/min. Both LA feedstock and carrier gas are introduced from the top of the fixed-bed reactor, the liquid products are collected at the exit of the reactor through a condenser and analyzed offline using an Agilent 6890 GC. The gas phase products are monitored by an online GC (Shimadzu 2014).

The same reaction set-up is applied to catalytic dehydration of 3-hydroxypropionic acid (3-HP). In the following context, dehydration of LA is described first, followed by dehydration of 3-HP.

Low yield to acrylic acid (AA) is the main problem that hinders the commercialization of LA dehydration process. In this disclosure, the yield to AA is enhanced by two approaches: (1) creating mesopores in the microporous structure of NaY; and (2) modifying the acid-base property of NaY.

Since the molecular length of LA is roughly the same with the largest pore opening of NaY, (*Biotech. Bioeng.*, 1987, 30, 794, *J. Am. Chem. Soc.*, 184, 106, 6092), modifying the structure of NaY is necessary to reduce the transport resistance during the catalytic reaction. Etching of NaY was carried out to introduce larger pores inside the NaY particles. Etching conditions, including temperature, etching time and concentration of the base, were optimized by employing the design of experiments (DoE) approach.

Figure 1:
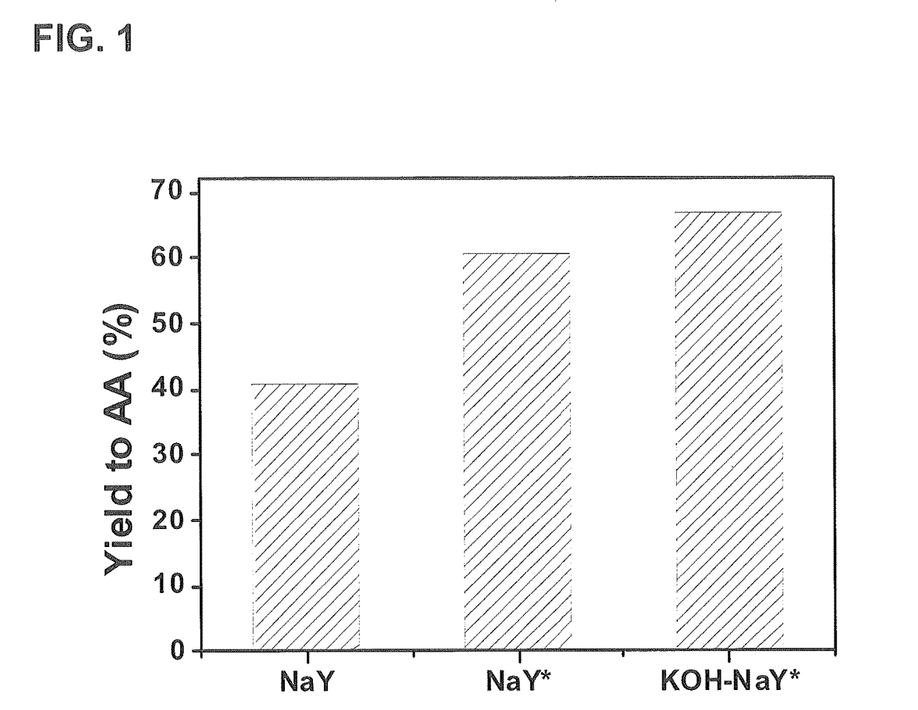
FIG. 1 shows yield of AA for the dehydration of LA over NaY, NaY* and KOH-NaY*, respectively. Catalyst loading: 0.2 g, WHSV: 1.2 g/$g_{cat}$·h, temperature: 643 K, flow rate of carrier: 30 ml/min, feeding rate of liquid: 0.02 ml/min LA (20 wt. %). Results are based on the 3$^{rd}$ h collection.

As shown in FIG. 1, significant increase in the yield of AA (from 40% to 60%) is obtained when pristine NaY is etched by NaOH. This improvement can be explained by the increased number of accessible active sites for the dehydration of LA. Therefore, the selectivity of AA is increased and side reactions are subdued. The yield of AA is further increased with additional KOH. Other alkali bases, such as LiOH, NaOH, RbOH and CsOH, have also been tested as promoters, but KOH shows the best promoting effect. The enhanced yield is related with the optimized acid and base sites for such specific dehydration reaction.

Figure 2:
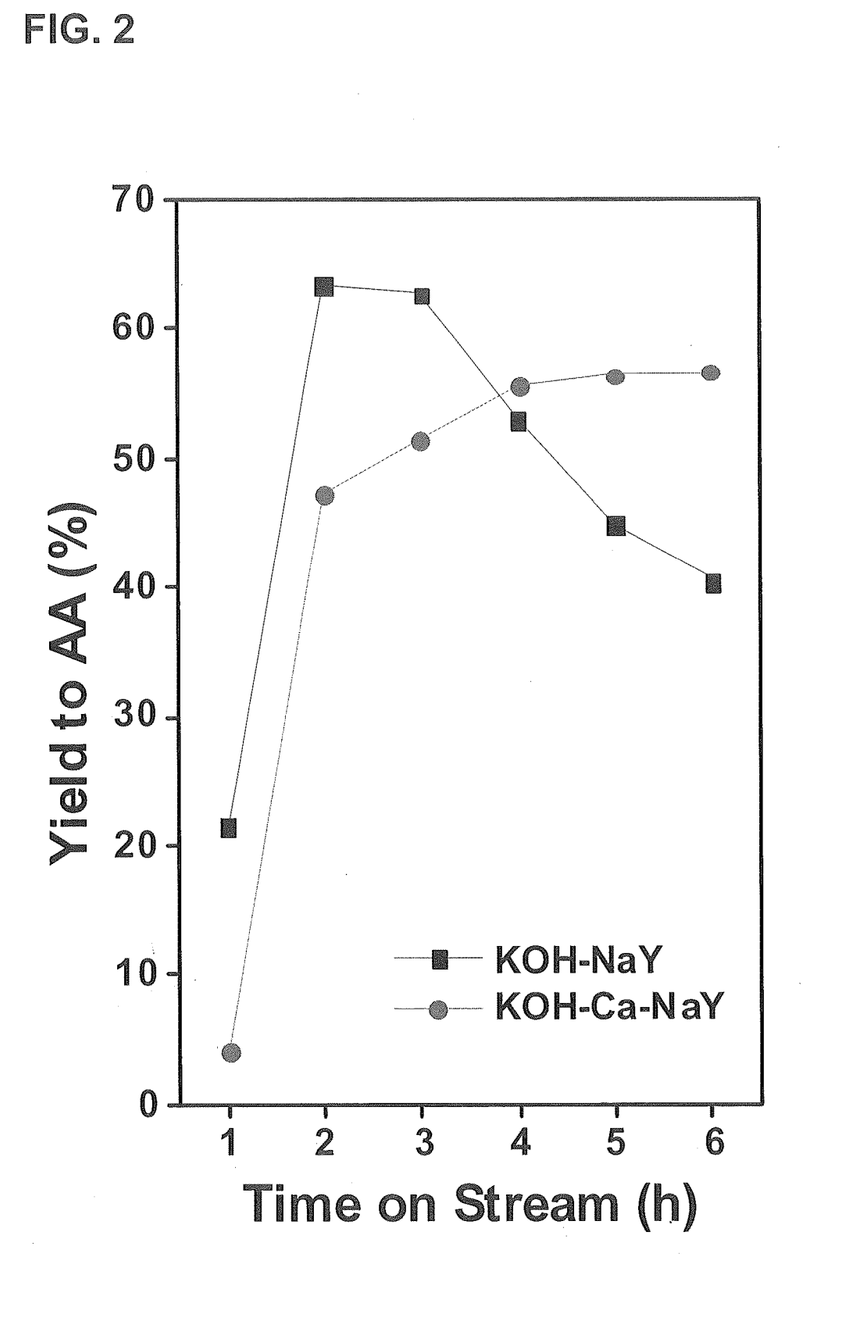
FIG. 2 shows the enhanced stability of KOH—NaY by adding Ca as a promoter. WHSV: 1.2 g/g$_{cat}$·h, temperature: 643 K, flow rate of carrier: 30 ml/min, feeding rate of liquid: 0.02 ml/min LA (20 wt. %).

Deactivation of catalysts is another issue which limits the application of LA dehydration in the industry process. In order to enhance the stability of present catalysts, KOH—NaY is modified by various metal cations as promoters, such as Ca, Mg, Sr, Ba, Fe, Zn, and La. Ca modified KOH—NaY is found to have high stability (FIG. 2). The prolonged lift-time of catalyst may be explained by the formation of new catalytic intermediate due to the existence of Ca. It is noted that the pre-induction period for the first 2 hours may due to the wetting of the whole catalytic system.

Figure 3:
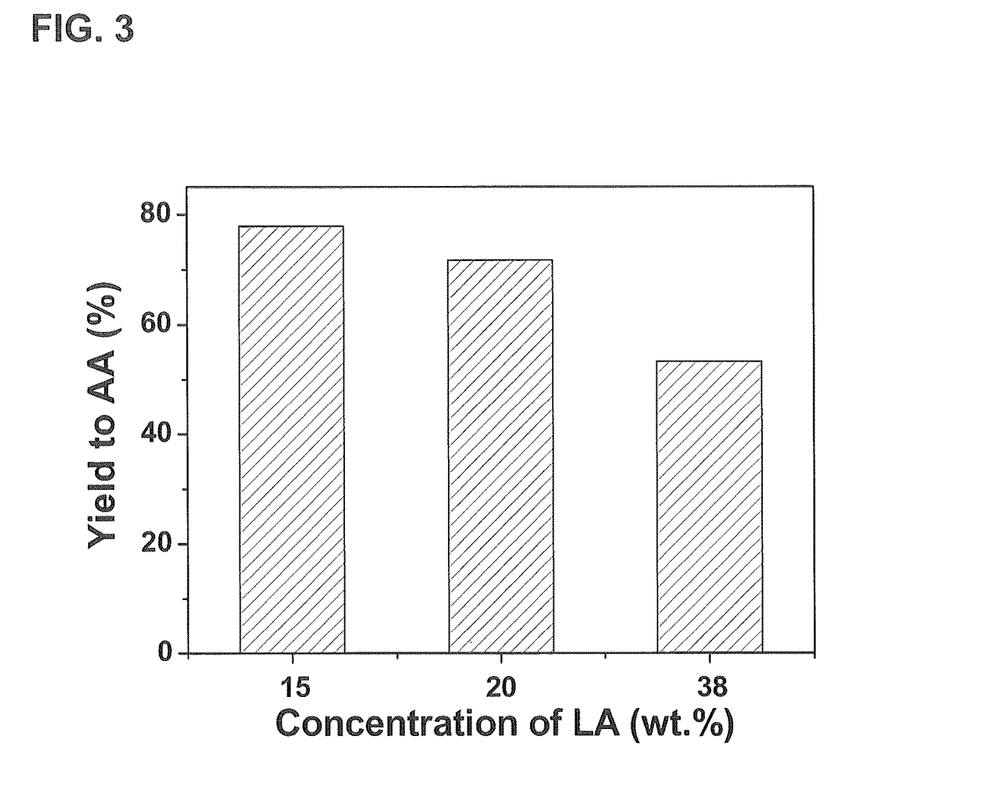
FIG. 3 shows the effect of concentration of LA on the dehydration of LA. KOH—Ca—NaY* was used as the catalysts. Catalyst loading: 1.0 g, temperature: 643 K, flow rate of carrier: 30 ml/min, feeding rate of liquid: 0.02 ml/min LA. Results are based on the 16$^{th}$ h collection.

The effect of LA concentration is studied by using KOH—Ca—NaY* as the catalyst. As shown in FIG. 3, yield to AA increases with the decrease in LA concentration. The high concentration of LA may induce the side reaction, such as the condensation of LA, resulting in low yield of AA. However, reducing the concentration of LA leads to low weight hour space velocity (WHSV), i.e., low catalytic efficiency.

Figure 4:
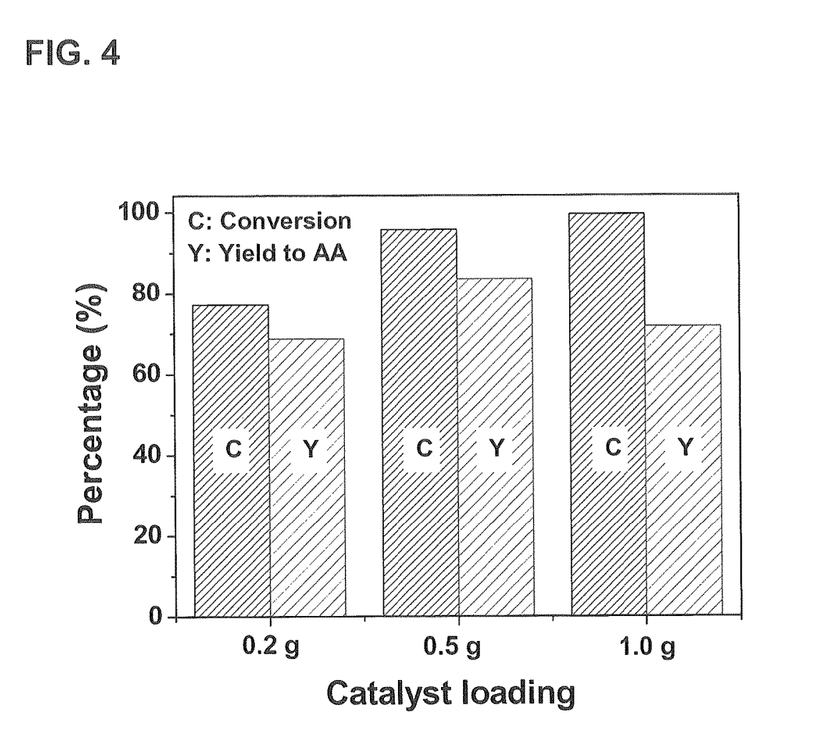
FIG. 4 shows the effect of catalyst loading on the dehydration of LA. KOH—Ca—NaY* was used as the catalysts. Temperature: 643 K, flow rate of carrier: 30 ml/min, feeding rate of liquid: 0.02 ml/min LA (20 wt. %). Results are based on the 6$^{th}$ h collection.

The effect of catalyst loading is also investigated by using KOH—Ca—NaY* as the catalyst. Conversion of LA increases with the loading of catalyst, while the highest yield to AA is obtained with 0.5 g of catalyst (see FIG. 4). The low yield obtained with less amount of catalyst is due to the insufficient conversion of LA. The decrease of yield at high catalyst loading may be ascribed to the further consumption of AA, as a result of prolonged contact time. It is noteworthy to mention that 83% yield of AA obtained by using 0.5 g of catalyst is significantly higher than the best reported one in US Publication No. 2012/0277467 (72%).

Figure 5:
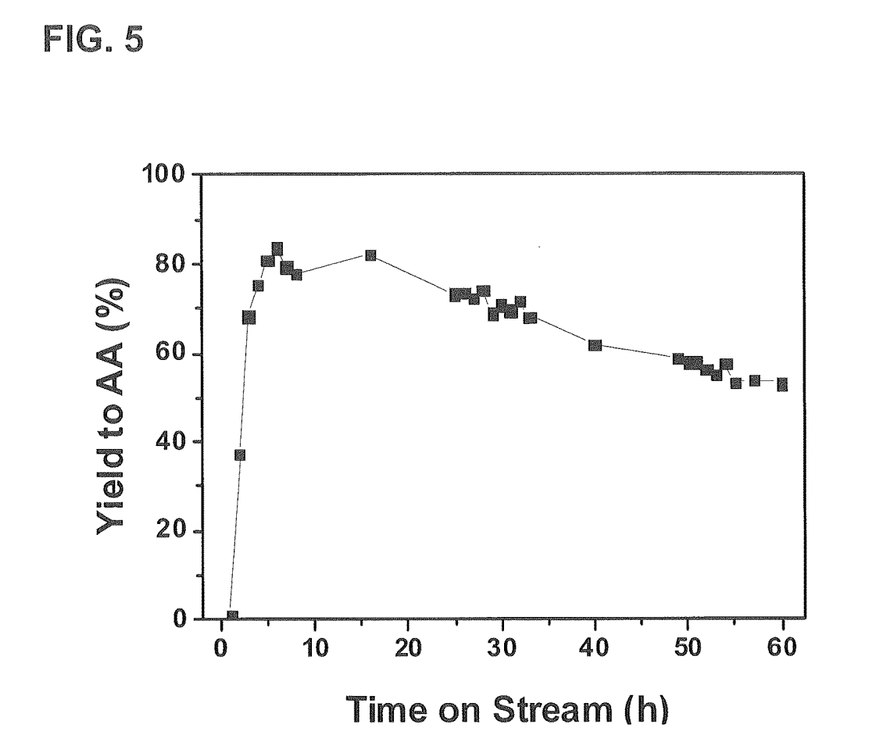
FIG. 5 shows the stability of KOH—Ca—NaY* catalyst on the dehydration of LA over 60 h run. Catalyst loading: 0.5 g, Temperature: 643 K, flow rate of carrier: 30 ml/min, feeding rate of liquid: 0.02 ml/min LA (20 wt. %).

Long term operation was carried out to examine the stability of KOH—Ca—NaY*, as shown in FIG. 5. The highest yield (83%) was obtained at the $6^{th}$ h. Beyond that, the catalyst started to deactivate slowly. The yield of AA remains above 70% within 30 h reaction and remains above 50% after $60^{th}$ h. This result is comparable with the best record in patent where calcium phosphate is used as the catalyst (yield of AA above 50% in 60 h operation, US Publication No. 2012/0277467).

Figure 6:
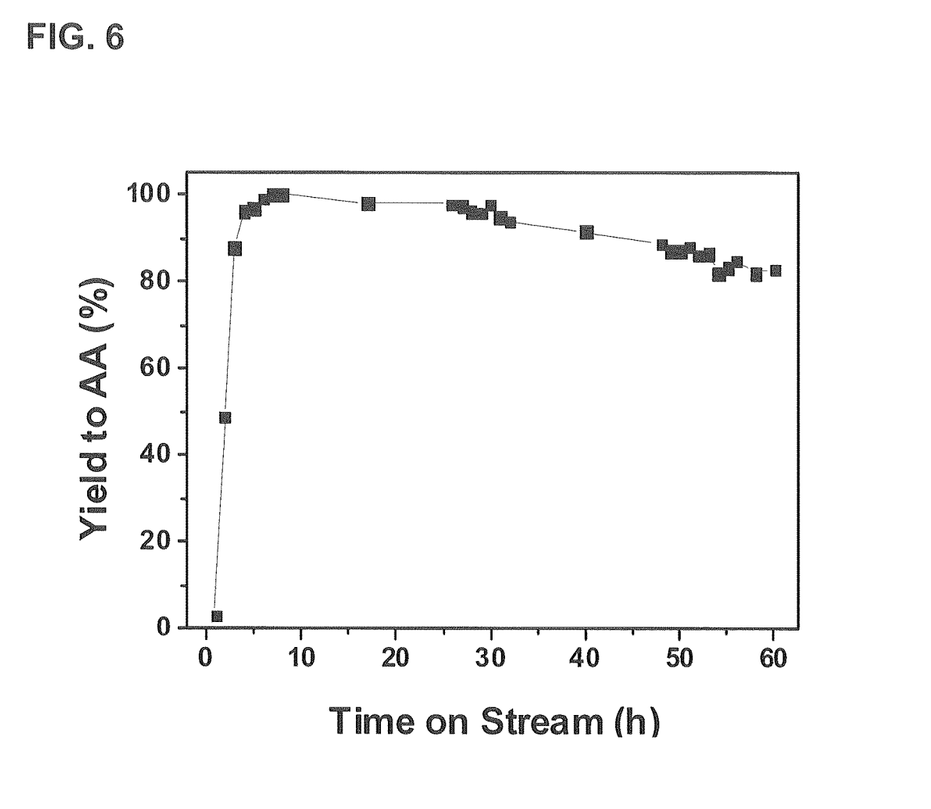
FIG. 6 shows the stability of KOH—Ca—NaY* catalyst on the dehydration of 3-HP over 60 h run. Catalyst loading: 0.5 g, Temperature: 643 K, flow rate of carrier: 30 ml/min, feeding rate of liquid: 0.02 ml/min 3-HP (20 wt. %).

The production of AA from the dehydration of 3-HP is also under investigation by large chemical companies. Therefore, the catalytic capability of KOH—Ca—NaY* was also tested on the dehydration reaction of 3-HP. As shown in FIG. 6, very high yield (99%) was obtained after a 3 h induction period, and the yield maintained above 90% during 40 h run. The deactivation is very slow. After 60 h testing, the yield to AA is still above 80%. The stability of present catalyst is comparable with that reported in PCT Publication No. WO 2007106100A1, in which TiO$_2$ was used as a catalyst and no obvious deactivation was observed within 44 h run. Higher WHSV is achieved by using present catalyst, compared to the published patents (see Table 3). Given the same yield, higher WHSV means less catalyst loading and smaller reactor are needed to generate same amount of products. Therefore, present KOH—Ca—NaY* shows a potential of low cost of AA production from 3-HP compared to those patents identified in Table 3. For TiO$_2$ based catalytic system, although WHSV value is close to present disclosure, the feeding concentration of 3-HP is low, which means additional energy consumption to evaporate the excess amount of water—the solvent.

TABLE 3

Comparison between present results and those reported in patents for the catalytic dehydration of 3-HP to AA.

| Catalysts | WHSV$^a$ (g/(g$_{cat}$·h)) | Yield of AA (%) | 3-HP feeding (wt %) | Patent information |
|---|---|---|---|---|
| KOH—Ca—NaY* | 0.48 | 99.0 | 20.0 | — |
| γ-Alumina | 0.036 | 97.0 | 20.0 | 0113822/USA/2010 |
| TiO$_2$ | 0.40 | 100.0 | 8.8 | 106100A1/WO/2007 |

$^a$WHSV: weight hourly space velocity = (mass flow rate of reactant)/(weight of catalyst).

In conclusion, herein disclosed sodium faujasite catalyst with superior catalytic performance has been developed for the production of acrylic acid from renewable source, e.g. bio lactic acid or 3-hydroxypropionic acid. This new catalyst is prepared by multistep modification of NaY zeolite. The catalyst shows much higher yield of acrylic acid and higher stability against deactivation compared to reported catalysts in the literatures and patents for the dehydration of lactic acid to acrylic acid. For the dehydration of 3-hydroxypropionic acid to acrylic acid, higher WHSV is applied compared to reported processes using other materials as catalysts, while both yield and catalytic stability remain comparable with reported values. Commercialization of the production of acrylic acid from lactic acid or 3-hydroxypropionic acid could be realized based on this new catalyst.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation.

Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. Method for preparing a catalyst comprising sodium faujasite, the method comprising:
   etching a sodium faujasite zeolite of formula (NaAlO$_2$)(SiO$_2$)$_x$·yH$_2$O, 1.2<x<450, 0<y<16 to create mesopores and macropores in the microporous framework and obtain an etched sodium faujasite zeolite;
   loading calcium onto the etched sodium faujasite zeolite to obtain a calcium-loaded sodium faujasite zeolite; and
   loading alkali metal hydroxide onto the calcium-loaded sodium faujasite zeolite to obtain the catalyst comprising sodium faujasite.

2. Method according to claim 1, wherein said etching comprises etching under heat.

3. Method according to claim 2, wherein said etching comprises etching under heat at between 298 K and 423 K.

4. Method according to claim 1, wherein etching comprises etching under stirring.

5. Method according to claim 1, wherein etching comprises etching under reflux.

6. Method according to claim 1, wherein said etching comprising etching by an etchant selected from the group consisting of a base and an organic etchant.

7. Method according to claim 6, wherein said base is selected from the group consisting of lithium hydroxide (LiOH), sodium hydroxide (NaOH), potassium hydroxide (KOH), rubidium hydroxide (RbOH), caesium hydroxide (CsOH), and mixtures thereof.

8. Method according to claim 6, wherein said base comprises sodium hydroxide.

9. Method according to claim 6, wherein said organic etchant comprises ethylenediaminetetraacetic acid (EDTA).

10. Method according to claim 1, wherein loading calcium onto the etched sodium faujasite zeolite comprises loading a calcium salt onto the etched sodium faujasite zeolite by an impregnation method.

11. Method according to claim 10, wherein loading calcium onto the etched sodium faujasite zeolite comprises loading a calcium salt onto the etched sodium faujasite zeolite by an incipient wetness impregnation method.

12. Method according to claim 10, wherein said calcium salt comprises calcium nitrate (Ca(NO3)2).

13. Method according to claim 1, further comprising calcining said calcium-loaded sodium faujasite zeolite prior to said loading of alkali metal hydroxide.

14. Method according to claim 1, wherein said alkali metal hydroxide is selected from the group consisting of lithium hydroxide (LiOH), sodium hydroxide (NaOH), potassium hydroxide (KOH), rubidium hydroxide (RbOH), caesium hydroxide (CsOH), and mixtures thereof.

15. Method according to claim 1, wherein said alkali metal hydroxide comprises potassium hydroxide.

16. Method according to claim 1, further comprising drying the obtained catalyst comprising sodium faujasite.

17. Method according to claim 16, further comprising pelletizing the dry catalyst comprising sodium faujasite.

18. Method according to claim 1, further comprising calcining the sodium faujasite zeolite prior to said etching.

19. Method according to claim 1, further comprising centrifuging the etched sodium faujasite zeolite prior to said loading of calcium.

20. Method according to claim 19, further comprising washing said etched sodium faujasite zeolite after centrifuging.

* * * * *